(12) United States Patent
Gudesen

(10) Patent No.: US 6,418,092 B1
(45) Date of Patent: Jul. 9, 2002

(54) METHODS FOR OPTICAL DATA STORAGE AND APPARATUS FOR SAME

(75) Inventor: Hans Gude Gudesen, Gamle Fredrikstad (NO)

(73) Assignee: Opticom ASA, Oslo (NO)

(*) Notice: Subject to any disclaimer, the term of this patent is extended or adjusted under 35 U.S.C. 154(b) by 0 days.

(21) Appl. No.: 09/142,385

(22) PCT Filed: Mar. 6, 1997

(86) PCT No.: PCT/NO97/00067

§ 371 (c)(1),
(2), (4) Date: Sep. 4, 1998

(87) PCT Pub. No.: WO97/33275

PCT Pub. Date: Sep. 12, 1997

(30) Foreign Application Priority Data

Mar. 7, 1996 (NO) .................................. 960957

(51) Int. Cl.⁷ ................................. G11B 7/00
(52) U.S. Cl. ................... 369/44.11; 369/44.23; 369/112.24
(58) Field of Search ................ 369/103, 112, 369/44.23, 44.37, 121, 109, 44.11, 112.24, 112.25, 112.26, 118; 365/234, 235, 113, 215, 112, 259

(56) References Cited

U.S. PATENT DOCUMENTS

| | | | |
|---|---|---|---|
| 3,902,788 A | | 9/1975 | Strehlow |
| 4,550,249 A | * | 10/1985 | Damen et al. ............ 369/44.42 |
| 4,633,445 A | | 12/1986 | Sprague |
| 5,379,266 A | * | 1/1995 | Russel ........................ 369/103 |
| 5,384,764 A | | 1/1995 | Nordal |
| 5,483,511 A | | 1/1996 | Jewell et al. |
| 5,754,514 A | * | 5/1998 | Guerra ....................... 369/112 |
| 5,764,603 A | * | 6/1998 | Glaser-Inbari ............. 369/112 |
| 6,005,817 A | | 12/1999 | Gudesen et al. |
| 6,078,468 A | * | 6/2000 | Fiske ........................ 360/104 |
| 6,094,413 A | * | 7/2000 | Guerra ....................... 369/112 |

FOREIGN PATENT DOCUMENTS

| | | |
|---|---|---|
| WO | 9 111804 | 8/1991 |
| WO | 9 313529 | 7/1993 |

* cited by examiner

Primary Examiner—Thang V. Tran
(74) Attorney, Agent, or Firm—Birch, Stewart, Kolasch & Birch, LLP

(57) ABSTRACT

In a method for optical data storage, a write/read device is employed with a first optical lens system consisting of an array of lenslets which are associated with one or more areas on a data-carrying medium which forms part of the optical data memory. During writing/reading of data in the data-carrying medium the optical data medium is positioned on one or more reference surfaces. When localizing or reading data which are stored in an optical data memory in this fashion, the data-carrying medium is brought in register with the first optical lens system in the write/read device, whereupon light from the write/read device passes through a set of angular coordinates, the optical response from the data-carrying medium being detected simultaneously and in parallel by means of the write/read device. A device for implementation of the method comprises a write/read device in which there is provided a first optical system consisting of an array of lenslets, one or more light sources for illumination of the lenslets, a second optical system for imaging of the data-carrying medium and an electronic detector, the write/read device being further connected to an analysis unit.

30 Claims, 2 Drawing Sheets

METHODS FOR OPTICAL DATA STORAGE AND APPARATUS FOR SAME

This application is the national phase under 35 U.S.C. §371 of prior PCT International Application No. PCT/NO97/00067 which has an International filing date of Mar. 6, 1997 which designated the United States of America, the entire contents of which are hereby incorporated by reference.

FIELD OF THE INVENTION

The invention concerns a method for optical data storage in an optical data memory which comprises data-carrying media in the form of sheets, foils, tapes, cards and disks, either separately or in combination, wherein data is stored in one or more data-carrying layers or volumes in the data-carrying medium/media and written and/or read by means of light, and wherein there is employed in the method of a write/read device with a first optical lens system and one or more light sources provided in optical relation to said first optical lens system. The invention is also directed to a method for positioning of an optical data-carrying medium for optical data storage in an optical data memory which comprises data-carrying media in the form of sheets, foils, tapes, cards and disks, either separately or in combination, wherein data is stored in one or more light-sensitive data-carrying layers or volumes in the data-carrying medium/media and written and/or read by means of light, and wherein there is employed in the method a write/read device with a first optical lens system associated with one or more light sources provided in optical relation to the first optical lens system, such that the first optical lens system is assigned to the data-carrying medium and directs light from the light source or light sources thereto. The invention is also directed to a method for localizing data stored in or written into an optical data memory which comprises data-carrying media in the form of sheets, foils, tapes, cards and disks, either separately or in combination, wherein data is written and/or read by means of light, wherein there is employed in the method a write/read device with a first optical lens system and one or more light sources provided in optical relation to the first lens system, and wherein for storage or writing a method is employed. The scope of the invention is specified solely in one of the claims which are, in part, directed to a device for implementing the method for the optical data storage and the method for localizing data stored in or written into an optical data memory, wherein the device comprises a write/read device.

BACKGROUND OF THE INVENTION

In general the present invention concerns methods and devices for optical storable and retrieval of data in planar data media or data carriers in the for cards, disks or tapes. Similarly, the invention also concerns the mechanical construction and procedures for mechanical handling and control of the data-carrying medium during write and read operations.

Medium-high density optical data storage today is totally dominated by laser-based tracking systems, in which a sharply focused light beam follows a data track under servocontrol. e.g. in a spiral pattern covering the surface of the rotating disk. This method has a number of serious drawbacks. First of all a high precision optomechanical system is required with attendant cost and space constraints. Secondly, reading is performed serially thus restricting the opportunities for sophisticated error correction by correlation and adaptation based on synoptic raw data acquisition from the data-carrying medium. Furthermore, very fast random access is impossible due to the mechanical tracking and finally it is difficult or impossible to increase the data density in the write/read speeds by multi-level data encoding at each individual datum location.

Recently a radically different concept has been proposed, based on incorporating a large number of microlenses in the actual data carrier and addressing a cluster of data spots under each microlenses by illumination of the microlenses from a predefined set of incidence angles, as described in Norwegian patent application no. 90 0443 with the title "Data storage medium and methods for input and output of data." The data spots are located in a thin bum film inside the data-carrying medium, thus causing light which is incident on the microlenses from the write/read device to be focused to a series of small spots in the burn film, one spot being assigned to each microlenses. The microlenses act as magnifying glasses, increasing the apparent size of each data spot in the burn film by one order of magnitude or more and making it possible for read-out to be performed by simultaneous imaging of large areas on the data-carrying medium, since the depth of field increases as the square of the resolution. The use of an electronic matrix detector, such as a CCD camera for the imaging enables the imaged data spot pattern to be subjected to logic operations which completely eliminate the need for mechanical alignment and tracking. In addition to this, the integration of microlenses and a data-carrying medium provides a number of other advantages. Unfortunately this is only in theory. For practical implementation in a commercial environment, there exists a number of technological as well as cost-related barriers: A major problem is that of mass production of data-carrying media with integrated microlenses, since in order to fully exploit the potential with regard to high data densities, each microlenses must be very precisely controlled with respect to physical shape, positioning relative to the burn film and bulk optical properties. Each individual data-carrying medium, such as a card or disk, typically has to incorporate hundreds of thousands or millions of microlenses, arranged in precisely defined patterns parallel to the data-carrying surface.

As a further example of prior art when using microlenses or lenslets in data-carrying medium, U.S. Pat. No. 4,663,445 (Sprague) may be mentioned, wherein the writing to a memory medium takes place sequentially with a scanning beam and reading takes place in parallel from a matrix of light sources, U.S. Pat. No. 3,902,788 (Strehlow) wherein lenslet matrixes are provided on each side of the memory medium and respectively applied to writing and reading, and International published patent application WO93/13529 (Russell) which discloses a random access optical memory wherein the data-carrying medium with integrated lenslets in some embodiments are in the form of data cards or data tapes which are introduced in a write/read device and position in relation thereto, the positioning taking place by means of spring mechanisms and reference surfaces in order to position data fields, for instance in relation to the detector used for reading.

Further known from U.S. Pat. No. 5,483,511 (Jewell et al.) is an optical memory system which employs a plurality of optical write/read beams from semiconductor layers for simultaneous writing or reading of information to a plurality of tracks in a moveable storage medium. A matrix of lasers for writing provided vertically relative to the data-carrying medium is used with an assigned matrix of microlenses in order to reduce the divergence of each laser beam and correspondingly another microlenses matrix is used for focusing the beams to a light spot on the detector matrix, possibly accompanied by compensation for field curvature. Essentially the data carrying medium or the memory medium in this case are a rotating disk, for instance of the CD-type, with spiral tracks or a moveable data type with parallel tracks. For deflection respectively to and from a memory medium and focusing thereto a relatively complicated data system with lenses, mirror and beam splitter is used.

At present a number of techniques are under development which are intend to be employed to create arrays of microlenses which are formed in situ by deposition, transformation, etching, etc. However, the current state of the this field is not such that quality size and cost parameters can simultaneously satisfy the demands for mass-produced data-carrying media suitable for consumer applications.

As an alternative to in situ solutions the use has been proposed of transparent microspheres which are mounted in regular arrays on a surface. The only known, possible source of microspheres with technical specifications which could satisfy the requirements of data-carrying media with integrated microlenses is presently Dyno Particles AS of Lillestrom, Norway, who employs a proprietary technique, known as the Ugelstad process for production of polymer microspheres in sizes restricted to 100 microns or less. In addition to the purely technical problems regarding the quality and uniformity of the microspheres themselves, the commercial viability of using microsphere-based, data-carrying media is dependent on resolving price and delivery issues stemming from the single-source situation, and these problems may well persist beyond the lifetimes of the patent protection of the method for manufacturing such microspheres according to the Ugelstad method. Even though perfectly smooth, round, clear and monosized polymer microspheres can be obtained in bulk at acceptable prices, a number of problems will still remain. These include the fact that the spheres have to be positioned on and integrated in the data-carrying medium at a commercially acceptable yield, acceptable speed and reasonable costs. This normally involves production lines which each supply a data carrier containing millions of microspheres every few seconds. Moreover, the spherical focusing surface creates imaging errors which limit the attainable spot size, especially at large apertures where spherical aberration is a serious problem. In addition, the Ugelstad process or the so-called "Swollen Emulsion" process limits the choice of optical materials for the microspheres. Thus the refractive index is typically in the range of N=1.5 to N=1.6, i.e. it is significantly less than for other polymer and glass optical materials which are currently in general use. A high microlenses index of refraction is therefore a significant factor in achieving small focal spot sizes and thereby high data storage densities.

OBJECTS AND SUMMARY OF THE INVENTION

The object of the present invention is to provide remedies for the shortcomings and difficulties inherent in the state of the art as set forth above. This applies both to mainstream technologies based on tracking laser beams and relative to integrated microlenses technology, and a particular object is to deal with isolated technical issues in connection with such technologies as well as potential barriers to their commercial exploitation.

This object is achieved according to the present invention with a method which is characterized by forming the first optical lens system from a number of lenslets arranging the lenslets in an arraylike configuration of lenslets such that the lenslets form a predetermined, freely chosen pattern, positioning the data-carrying medium such that each lenslet is assigned to one or more areas on one of the respective data-carrying media of the optical data memory, and directing light from the light source or light sources through the optical lens system, such that each lenslet directs the light to the respective area(s) associated with it on the data-carrying medium. This object is further achieved by a method which is characterized by positioning the data-carrying medium on at least one reference surface, the position of the data-carrying medium being maintained through at least one cycle which comprises writing and reading respectively or only reading of data in the data-carrying medium. This object is also achieved in part by a method which is characterized in that in a first stage it comprises bringing the data-carrying medium to register with the first optical lens system in the write/read device by means of a translational and/or rotational movement generated by mechanical servos which in engagement with the data-carrying medium are controlled by a deviation minimizing program, and in a second stage allowing light from the write/read device to pass through a discrete or continuous set of angular coordinates which are located near one or more sets of reference angular coordinates, the optical response from the data-carrying medium being detected simultaneously and in parallel by means of the write/read device as a predetermined set of x,y coordinates, with subsequent generation of angle correction data for all x,y coordinates; together with a device which is characterized in that there are provided integral with the write/read device a first optical system consisting of an array of lenslets, one or more light sources arranged to illuminate the lenslets individually or in parallel and with predetermined illumination parameters, with the result that light from the lenslets is directed toward specific areas on a data-carrying medium inserted in the device, a second optical system arranged for imaging of the illuminated data-carrying medium and an electronic matrix detector with a light-sensitive elements arranged in a one- or two-dimensional pattern for recording the illuminated data-carrying medium, and that the write/read device is further connected to a logic unit arranged for analysis of the recorded image emitted in the form of signals from the electronic matrix detector.

Further features and advantages are presented in the attached dependent claims.

BRIEF DESCRIPTION OF THE DRAWINGS

The invention will now be explained in more detail with reference to the accompanying drawing in which.

DETAILED DESCRIPTION OF PREFERRED EMBODIMENTS

Figure 1:
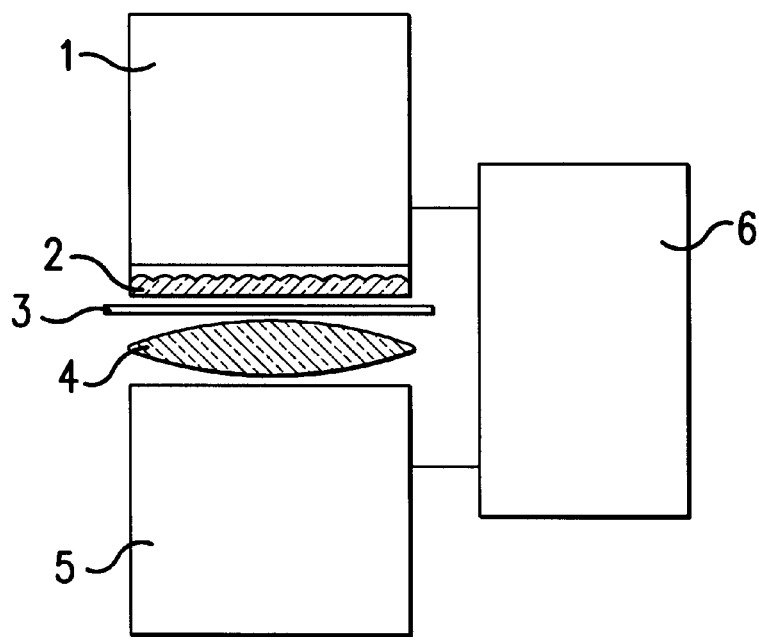
FIG. 1 is a general schematic illustration of a write and/or read device.

As illustrated in FIG. 1, a write /read device contains an optical element in the form of a transparent plate 2 with a matrix of lenslets 2', a large number of identical lenslets being arranged in a predetermined pattern, typically in rows and columns in a square or rectangular grid or in a close-packed, e.g. hexagonal pattern. The lenslet matrix plate 2 is illuminated from above by a light source, the light being focused at one or more spots in the data-carrying medium 3 below. Light which is transferred or re-emitted from the data-carrying medium 3 is imaged by a second optical lens system 4 on to the electronic matrix detector 5 and the signals from the latter are analysed by a logic unit 6 which also controls the various sub-assemblies in the write/read device.

The data-carrying in medium 3 is typically planar, containing a data-carrying layer which may be of the read-only-memory, (ROM) type or the "Write Once Read Many Times" (WORM) type or of the multiple write and erase type ("ERASABLE" type).

Figure 2:
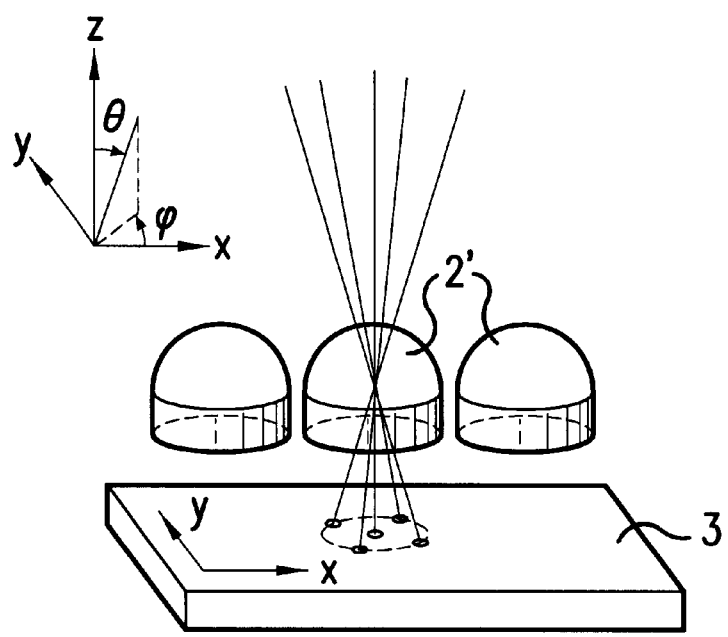
FIG. 2 illustrates optical addressing of a given bit location in a data-carrying medium.

Data is stored in the data-carrying medium 3 as precisely defined optical properties in a data-carrying layer provided in the medium, at specific microscopic areas, which are termed "spot locations" below, each of which has associated with it a unique address which may be written x, y, θ, ø. FIG. 2 illustrates the optical addressing of a given spot location on the data-carrying medium 3 and shows the center beams for light beams which strike a lenslet 2' from five directions. The lenslets 2' naturally form a part of the lenslet matrix plate 2. As illustrated in FIG. 2, each lenslet 2' has associated with it a cluster of spot locations which are optically accessed through the lenslet by illumination at angles θ, ø. Thus, θ, ø can be defined as spot location coordinates relative to the associated lenslet, whereas the x, y part of the address denotes the coordinates for the relevant spot location cluster, relative to the coordinate system on the surface of the data-carrying medium. In the case of data-carrying media which remain immobile in the write/read device during writing and/or reading (no mechanical motion), the x,y coordinate can also denote the centre coordinates for the different lenslets 2' in the write/read device which are in a one-to-one correspondence with the spot location clusters.

Upon insertion into the write/read device, the data-carrying medium 3 is held in position relative to the lenslet matrix plate 2, thereby enabling light Which is focused through the latter to come into focus in the data-carrying layer in the data-carrying medium. In order to obtain small focal spots and hence high data density the distance between the lenslets and the data-carrying layer must be controlled with great precision, typically within a tolerance range of $\pm 0.5 \,\mu m \leq \delta \text{ (distance)} \leq \pm 50 \,\mu m$.

Figure 3A:
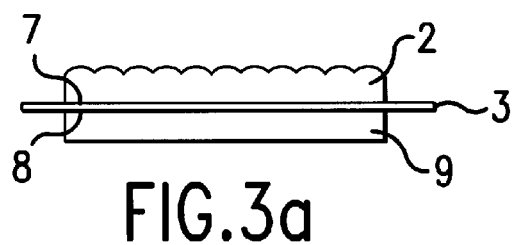
FIG. 3 illustrates the mounting of a flexible data-carrying medium.
Figure 3B:
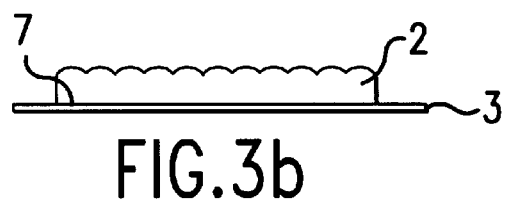
Figure 3C:
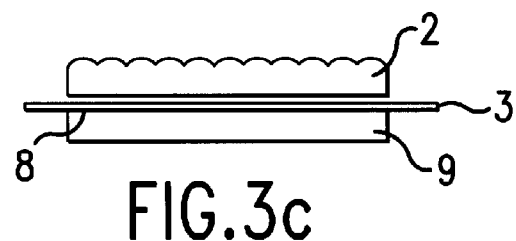

FIG. 3 illustrates examples of the mounting of a thin, flexible data-carrying medium which is positioned against two flat reference surfaces 7,8 as illustrated in FIG. 3a, which shows how a close contact between the reference surfaces 7,8 for example, can be achieved by means of mechanical securing or clamping between two flat surfaces, or against a flat reference surface 7, as illustrated in FIG. 3b. A second alternative which is well known from its use in holding recording paper in x,y recorders and the like, is the use of electrostatic attraction towards a supporting surface. This kind of situation corresponds to that which is schematically illustrated in FIG. 3b, where electrostatic or pneumatic forces are employed against the supporting or reference surface 7 on the same side as the light source, while FIG. 3c illustrates the use of electrostatic or pneumatic forces against the supporting or reference surface 8 on the detector side. In the latter case the supporting surface 8 is covered by a bearing surface in the form of an optically transparent electrode 9, e.g. of indium tin oxide. A further alternative which is well known from, e.g., lithographic contact printing, is the application of a gas pressure differential in order to push the data-carrying medium 3 against the supporting surfaces 7 or 8 (not shown).

Figure 4:
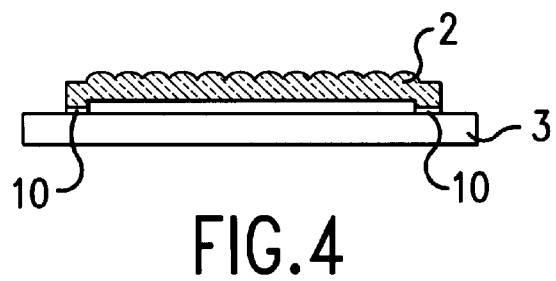
FIG. 4 illustrates the mounting of a rigid data-carrying medium.

In the case of a rigid, self-supporting data-carrying medium, this does not need any reference surface in order to achieve the desired flatness or shape, but still has to be positioned with high precision relative to the lenslet matrix plate 2. FIG. 4 illustrates how this is achieved by pressing the data-carrying medium against mechanical reference points 10 in the write/read device.

The various schemes for mounting and securing the data-carrying medium as illustrated in FIGS. 3 and 4, where light sources and detection systems are omitted for the sake of clarity, become increasingly vulnerable to dust, contamination and mechanical imprecision as the tolerance δ (the distance) becomes less. In very high data density media a particle with dimensions of only a few microns, lodged between the data-carrying medium and one of the supporting surfaces 7,8 in FIG. 3, could brine the data-carrying layer out of focus. Strategies for avoiding this may include avoiding contamination of the data-carrying medium or the supporting surfaces. In the case of removable data-carrying media, where mechanical sealing is impossible, a combination of methods may be employed, including the application of a filtered airstream, keeping the data-carrying medium in a sealed envelope which is opened automatically as soon as it is inserted in the write/read device and by employing automatic cleaning procedures.

If a rigid data-carrying medium 3 is used as illustrated in FIG. 4, with mechanical positioning against a few, for example 3 or more, pointed surfaces 10 on the supporting surface, particles at the contact points will be brushed aside when the data-carrying medium is inserted. Outside these small contact areas the spacing between the data-carrying medium and other parts of the write/read device will be sufficient to accommodate contaminating particles without dislocation of the data-carrying medium.

In order to avoid spurious signals due to particles or blemishes on the surfaces between the lenslet matrix plate 2 and the top surface of the data-carrying medium 3, the data-carrying layer may be located some distance inside the data-carrying medium. This prevents such contamination and any blemishes from coming into focus, in analogy with the scratch protection strategy in CD disks.

Depending on cost and performance specifications it may be desirable to place an antireflection coating on the surface of the reference surfaces or the supporting surfaces 7,8, where they face the lenslet matrix plate 2 and the data carrier 3 respectively in order to avoid Fabry-Perot resonances, spurious reflections and light loss.

Figure 5:
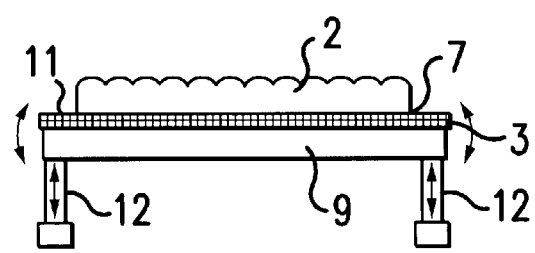
FIG. 5 illustrates a data-carrying medium Keith an optical contact coating in an autofocusing arrangement.

Partial protection against reflection and other benefits can be obtained by employing a data-carrying medium 3 on which is provided a thin, transparent, soft layer 11, as illustrated in FIG. 5. The material 11, termed "optical contact coating" below, is elastic, e.g. in the form of a transparent silicon polymer, and when it is pressed against the reference surface 7 on the lenslet plate 2 it closes the air gap between the reference surface 7 and the top of the data-carrying medium. In order to prevent air bubble entrapment, the optical contact coating 11 should have a microtextured surface and/or a slightly convex shape and/or the data-carrying medium may be aligned from one edge upon insertion. In addition to the antireflection feature a thin optical contact coating, may be beneficial in moderating the effect of contaminating particles in simple mounting and securing arrangements as illustrated for example in FIG. 3a.

As illustrated in FIG. 5, an optical contact coating 11 with a thickness and elasticity which provide adequate freedom of movement can be employed in conjunction with mechanical actuators 12 under feedback control to optimize the focal distance. This permits a relaxation of the mechanical precision requirements (cf. the discussion above relating to distance tolerance δ), and the sensitivity to particle contamination is reduced. Of course, active distance control will also be possible without the use of an elastic optical contact coating, in which case the mechanical mounting becomes slightly more complex. E.g.: mechanical translation of the lower support or reference plate 8 in the device in FIG. 3c or FIG. 4, where in the latter case the mechanical stops would be positioned outside the range of travel.

As described thus far the data-carrying medium 3 has been decided as mechanically clamped relative to the write/read device during the writing, and reading operations. In certain cases where it is desired to read large amounts of data from a data carrier without employing a large and costly electronic matrix detector, it is desirable to displace the data-carrying medium 3, so as to introduce new portions of the latter into the write/read region. This can be achieved in steps by a sequence of securing or clamping operations of the type which is described above. In the case of a rigid, self-supporting data-carrying medium continuous motion can also be achieved by employing, appropriate mechanical guides of a type which is well known in the art and therefore does not need to be described here.

The writing of data on the data-carrying medium will now be described in more detail. Data can be written by directing light incident at the relevant angles θφ on the relevant lenslet which addresses spot location clusters at the coordinates x,y in a short pulse of sufficient intensity to create a change in the optical properties of the data-carrying, layer at the addresses x,y,θ,φ. Depending, on the application, a single lenslet 2' may thus be illuminated at a time or several lenslets may, be illuminated in parallel. Furthermore, the intensity, duration, spectral content and coherence properties of the light from the light source may vary, within very wide limits, depending, on the type of information or data-carrying, layer, etc. The design of light sources for writing are outside the scope of the present invention, and therefore no explicit description of these is included here, since it is presumed that the design of such light sources will be well known to a person skilled in the art. It should be noted, however, that the light source 1 may consist of a number of small light-emitting elements with a typical diameter of circa 50 μm which can illuminate the individual lenslets 2' in parallel. If a light source 1 is used consisting of a single large light-emitting element, the strip of light is collimated and directed towards the lenslet matrix plate 2 at a desired angle.

A lenslet matrix 2' is not the only optical system which can be used for writing data on the data-carrying medium 3. Since the data-carrying medium 3 is a separate physical entity, separated from the lenslet plate 2, a single, pulsed laser beam can be scanned across the data-carrying medium in a different setting from those which are given by the context of a write/read device, e.g. at the production location. The basic criterion is that the data should be written into the correct spot locations on the data-carrying medium 3. Alternatively, other physical or chemical processes (stamping or molding of pits, exposure of photo-sensitive film through an encoding mask) could be used to encode the desired optical response at the spot locations.

Writing of data to a data-carrying medium containing previously written data requires alignment of new spot locations relative to already existing ones. Alignment techniques are discussed below.

Reading may be performed by means of an angle-selective illumination of a single lenslet at a time, in which case a matrix detector is not explicitly required. Of greater practical interest, however, are techniques where the whole lenslet matrix plate 2 and the corresponding part of the data-carrying medium 3 are illuminated simultaneously and the optical responses from all illuminated spots on the data carrier are imaged in parallel onto a matrix detector 5, as illustrated in FIG. 1. Several illumination modes of this type are possible.

For illustrative purposes, it should be assumed here that a broad, collimated light beam from the light source 1 is sequentially directed onto the whole lenslet matrix plate 2 in a set of discrete directions $\theta_i,\phi_i$, ($1 \leq i \leq N$, where N is the total number of available illumination directions). At each given illumination direction $\theta_i,\phi_i$, this causes each lenslet to focus a light beam on to the spot location $\theta_l,\phi_l$ in its associated complement of spot locations, thus interrogating the logic state at this point. The logic state is thereby revealed at all spot locations $x_j,y_j,\theta_i,\phi_i$, ($1 \leq j \leq M$, where M is the number of illuminated lenslets), in a single imaging operation on to the matrix detector 5. By extension the logic state at all spot locations in the data-carrying medium 3 can be determined by performing one imaging operation for each of the N illumination directions.

Since the logic unit 6 controls the illumination direction, the $\theta_i,\phi_i$ coordinate is known during each read-out cycle from the matrix detector 5, and the resolving power of the optical system 4 imaging the data on to the matrix detector, as illustrated in FIG. 1, needs only to be high enough to distinguish between the spot location clusters associated with the different lenslets 2'. Thus a low-resolution optical system 4 can be used, with a correspondingly wide image field and resolution depth. The possibility of accessing a large data field on the data-carrying medium with a fixed-focus imaging system has profound practical implications, especially since it becomes possible to achieve very high speed data accessing and write/read devices with no mechanical motion.

In applications where the data-carrying medium 3 is initially blank when it is introduced into the write/read device and acts as a temporary storage unit or data recipient only, the data-carrying medium can be clamped in a fixed position relative to the lenslet matrix plate 2, all spatial references being derived from the write/read device without the need for pre-formatting or prealignment.

The appropriate data carriers will either be of the WORM or ERASABLE type. The data-carrying medium with the data thus stored may subsequently be removed from the write/read device for later re-insertion into the same or into another write/read device or it can be discarded and replaced with another, blank data-carrying medium. Reinsertion implies another dimension of complexity, however, cf. the discussion of the alignments below.

Even in the case where writing and reading are performed on a data-carrying medium which remains immobile in the write/read device, precautions must be taken in order to avoid misalignment between the lenslet matrix and the spot locations on the data-carrying medium. Misalignment may arise due to dimensional changes (swelling or shrinking on account of ageing, absorption of air moisture or ambient chemicals or due to differential thermal expansion, different thermal expansion rates for structural elements in the lenslet matrix plate on the one hand and the data carrier on the other hand). The former can be controlled by sealing and the choice of chemically stable materials. The latter imposes compatibility restrictions on the choice of materials for the lenslet matrix plate and the data-carrying medium. These restrictions become progressively more severe as the lateral extent of the illuminated region on the data-carrying medium increases, since the maximum misalignment due to differential thermal expansion scales linearly with the length across which recording has to be maintained.

On the other hand the materials in the lenslet matrix plate 2 and the data-carrying medium 3 can be deliberately chosen with heat expansion compatibility in mind and a relative differential thermal expansion $\leq 10^{-4}$ can easily be achieved within a reasonable working temperature range of for example ±30° C. even for plastic materials. For lenslets with a diameter of less than 50 microns. this implies a misalignmnent between a 50 mm wide string of lenslets and their associated spot location clusters of not more than 5 microns. i.e. 10% of the lenslet diameter. This is the worst case scenario otherwise the recording will be correct.

As stated above, different methods will now be described for aligning an already described data-carrying medium which has been inserted into a read device. In this case the read device has to perform a number of operations in order to ensure correct assignment of addresses $x_j, y_j, \theta_i, \phi_i$ for all spot locations on the data-carrying medium. This applies to read-only storage applications as well as cases where data files stored in media of the WORM type and the ERASABLE type have to be supplemented or re-read.

In principle it is a simple matter to insert the data-carrying medium 3 and cause the lenslet matrix 2 to record with the corresponding cluster of spot locations, e.g. by means of servo-driven alignment with cursors in the data-carrying medium. In practice this becomes increasingly difficult at high data densities, i.e. when the distances between the spot locations in the data-carrying medium are small. At high data densities, therefore, the spot locations can be separated by 1 micron or less, and even a very small misalignment between the lenslet matrix plate and the data-carrying medium which is easily created by differential thermal expansion, distortion, shrinking, etc. will interfere with the addressing process.

This problem can be solved by a combination of address which involves "static"alignment on a coarse scale and "dynamic" alignment on a fine scale The static alignment involves mechanical translation and rotation of the data-carrying medium 3 relative to the lenslet matrix plate 2 in order to minimize spatial misalignment between the individual lenslets 2' in the lenslet matrix plate 2 and their associated spot location clusters. This procedure is based on static dimension tolerances which are built into the lenslet matrix plate 2, and the data-carrying medium 3 and the lenslets 2' must be sufficiently large to keep a misalignment during the recording within given values under all working conditions (e.g. temperatures). This is achieved by a suitable choice of materials, cf. the above description.

The static alignment ensures that light from each lenslet 2' is focused on the nominal spot locations associated with this lenslet. A typical displacement in the data-carrying layer should not exceed 5–10% of the lenslet diameter, corresponding to 1–10 spot location separations, depending on the data density. The remaining displacement is corrected by a dynamic alignment, a correction depending on the position of the lenslet being introduced into the set of addressing angles $\theta, \phi$, as follows:

a) after completion of the static alignment a set of selected lenslets 2' are illuminated which cover the active write/read area in the data-carrying medium 3 at a number of angles of incidence, a search being made for reference signals from predetermined spot locations. For example the relevant lenslets 2 can be connected to reference marks in the data-carrying medium 3 only at nominal angular positions $\theta=0, \phi=0$. The search starts at these angular coordinates and will now find that the correct angle will be slightly different, since the correction angles are dependent on the lenslet position x,y.

b) The correction angles are entered in a logic memory in the logic unit 6 together with the x,y address for each reference lenslet.

c) A reference table or interpolation procedure is generated in the read-out logic in the logic unit 6, providing correct addressing angles for all lenslets 2'.

In this case read-out is generally not possible with a single imaging operation for simultaneously illuminated lenslets 2' in all x,y positions since the illumination can pass through a set of correction angles or a correction angle area stepwise or in a sweep mode. For each correction angle the logic unit 6 will identify the correct block of x,y coordinates and assign the data content recorded at these specific spot locations. The dynamic alignment procedures can be implemented with different degrees of technical refinement, since the number of reference lenslets and reference angles can be varied, and verification tests can be employed on the angular correction results. In this context, therefore, it will principally be a case of a compromise between the data density in the data-carrying medium 3 on the one hand and the speed and complexity and thereby the cost on the other.

It will be seen from the above description of the present invention that the use of a matrix with an array of lenslets integrated in the write/read device in order to perform optical addressing of data in a planar data-carrying medium combined with electronic imaging on a large scale provides a number of advantages which have not been capable of implementation with the hitherto known methods in the prior art. Thus the present invention permits the use of a combination of high data accessing and transfer speeds with high data densities, while at the same time the hardware used for writing/reading of the data-carrying media is both inexpensive and robust.

What is claimed is:

1. A method for optical data storage in an optical data memory system including a replaceable optical data carrying medium having at least one storage layer, said method comprising:

a) providing plural lenslets, each lenslet associated with a group of data storage locations on a said data-carrying medium, said groups of data storage locations associated with said plural lenslet being arranged in an arrayed configuration;

b) fixing a data-carrying medium in a predefined relationship with said plural lenslets;

c) passing light through one or more desired lenslets with accessing device at a selected angular orientation to select an individual data storage location in each group of data storage locations of the data-carrying medium located in said step (b); and d) selectively replacing said data carrying medium with a new medium.

2. The method according to claim 1, wherein the light is directed towards each lenslet, each lenslet at a given time thereby forming one focal point at a time in a light-sensitive layer or volume in the data-carrying medium.

3. The method according to claim 2, wherein the directions of the light are selected within a predetermined set of directions, with the result that a focal spot formed by each lenslet in the light-sensitive layer or volume is located in a position which is uniquely associated with the chosen direction and identifies a single data storage location.

4. The method according to claim 2, wherein an optical response from the light-sensitive layer or volume in the data-carrying medium is changed under the influence of the light directed through a first lens systems, whereby data is written into the data-carrying medium.

5. The method of claim 1 further comprising shifting a data carrying medium with respect to said lenslets to present a new data carrying area thereof as said new medium.

6. The method of claim 1 further comprising replaceably positioning said data-carrying medium on a reference surface.

7. The method according to claim 6, wherein the position is maintained by holding the data-carrying medium between two reference surfaces.

8. The method according to claim 6, wherein the position is maintained by conveying and holding the data-carrying medium against the reference surface by an electrostatic force.

9. The method according to claim 6, wherein the position is maintained by conveying and holding the data-carrying medium against the reference surface by a pneumatic force.

10. The method according to claim 6, wherein a rigid data-carrying medium is employed, the position of said data-carrying medium being maintained by conveying and holding the data carrier against supports on at least one reference surface.

11. The method of claim 1 wherein said light generated in said step c) is generated by a light source, said lenslets being interposed between said light source and said optical data carrying medium.

12. The method according to claim 11, wherein the data-carrying medium is held against the reference surface by a pressing plate having at least one side is coated with an elastic transparent layer, the position of said data-carrying medium being maintained by a partial compression of the elastic layer when the data-carrying medium is conveyed towards the reference surface.

13. The method according to claim 12, wherein the data-carrying medium for a write/read cycle is actively positioned in the correct position in relation to the first optical line system by means of two or more focus-seeking servos provided on the accessing device.

14. The method according to claim 13, wherein the data-carrying medium is actively positioned by means of translation and/or rotation of the data-carrying medium, the translation and/or rotation being effected by one of the servos exerting varying pressure against difference sections of the data-carrying medium, thus causing the elastic layer to be compressed to a varying degree.

15. The method of claim 11 wherein said lenslets are integrally attached to said optical data carrying medium.

16. A method for optical data storage in an optical data memory system including a replaceable optical data-carrying medium having at least one storage layer, said method comprising:

a) providing plural lenslets, each lenslet associated with a group of data storage locations on a said data-carrying medium, said groups of data storage locations associated with said plural lenslet being arranged in an arrayed configuration;

b) fixing a data-carrying medium in a predefined relationship with said plural lenslets;

c) passing light through one or more desired lenslets with an accessing device having a first optical lens system at a selected angular orientation to select an individual data storage locations in each group of data storage locations of the data-carrying medium located in said step b);

d) to establish the predefined relationship registering the data-carrying medium with the first optical lens system of said accessing device by providing translational or rotational movement of said data-carrying medium with respect to said first lens system said step c) of passing allowing light produced by said accessing system to pass through a set of angular coordinates, the light responses of each of said groups of data storage locations being detected simultaneously and in parallel by means of a detector provided in source accessing device as a predetermined set of positional coordinates uniquely identifying the position of each of said groups of data storage locations.

17. The method of claim 17 wherein said light generated in said step c) is generated by a light source, said lenslets being interposed between said light source and said optical data carrying medium.

18. The method of claim 17 wherein said lenslets are integrally attached to said optical data carrying medium.

19. A method according to claim 18, wherein the detector is an electronic camera.

20. The method of claim 16 wherein said step d) of registering is accomplished by servos operatively engaged to said data-carrying medium.

21. The method of claim 20 wherein said servos move said data-carrying medium with respect to said lenslets.

22. The method of claim 21 wherein said servos move said data carrying medium with respect to said lenslets to present a new data carrying area thereof as said new medium.

23. A accessing device in an optical data memory system for accessing a replaceable optical data-carrying medium having at least one storage layer, said device comprising:

plural lenslets, each lenslet associated with a group of data storage locations on a said data-carrying medium, said groups of data storage locations associated with said plural lenslet being arranged in an arrayed configuration;

a support fixing a data-carrying medium in a predefined relationship with said plural lenslets;

a light source assembly passing light through the lenslets with an accessing device at a selected angular orientation to select an individual data storage location in each group of data storage locations on the data-carrying medium; and selectively replacing said data carrying medium located by the support with a new medium.

24. The accessing device of claim 23 wherein said lenslets are interposed between said light source and said optical data carrying medium.

25. The accessing device of claim 24 wherein said lenslets are integrally attached to said optical data carrying medium.

26. The accessing device of claim 23 wherein said light source assembly passes said light through said lenslets in accordance with predetermined illumination parameters.

27. A device according to claim 26, wherein the predetermined illumination parameters include parameters for illumination direction, illumination duration, illumination intensity and the spectral characteristics of illumination.

28. A device according to claim 27, wherein a logic unit is adapted for control and checking of read/write functions of the device.

29. A device according to claim 23, further comprising a holder for the data-carrying medium.

30. A device according to claim 29, further comprising focus-seeking servos connected to the holder.

* * * * *